United States Patent
Xu

(10) Patent No.: US 12,108,334 B2
(45) Date of Patent: Oct. 1, 2024

(54) METHOD AND DEVICE FOR MONITORING PHYSICAL DOWNLINK CONTROL CHANNEL, AND TERMINAL

(71) Applicant: GUANGDONG OPPO MOBILE TELECOMMUNICATIONS CORP., LTD., Guangdong (CN)

(72) Inventor: Weijie Xu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 367 days.

(21) Appl. No.: 17/398,698

(22) Filed: Aug. 10, 2021

(65) Prior Publication Data
US 2021/0368445 A1 Nov. 25, 2021

Related U.S. Application Data

(63) Continuation of application No. PCT/CN2019/075243, filed on Feb. 15, 2019.

(51) Int. Cl.
*H04B 7/185* (2006.01)
*H04W 24/08* (2009.01)
(Continued)

(52) U.S. Cl.
CPC ....... *H04W 52/0232* (2013.01); *H04W 24/08* (2013.01); *H04W 72/23* (2023.01); *H04W 80/02* (2013.01)

(58) Field of Classification Search
CPC . H04W 52/0232; H04W 24/08; H04W 72/23; H04W 80/02; H04W 52/0216;
(Continued)

(56) References Cited

U.S. PATENT DOCUMENTS 7,952,565 B2 * 5/2011 Park .................. G06F 1/3262
345/173
8,600,379 B2 * 12/2013 Kim .................. H04W 52/0245
455/574

(Continued)

FOREIGN PATENT DOCUMENTS

| CN | 105578520 A | 5/2016 |
|----|-------------|--------|
| CN | 109314869 A | 2/2019 |

(Continued)

OTHER PUBLICATIONS

International Search Report (ISR) dated Sep. 27, 2019 for Application No. PCT/CN2019/075243.

(Continued)

*Primary Examiner* — Amancio Gonzalez
(74) *Attorney, Agent, or Firm* — Ladas & Parry LLP

(57) ABSTRACT

The embodiments of the present application provides a method and a device for monitoring a physical downlink control channel and a system, relating to a field of communication, the method includes: monitoring, by a terminal, a power saving signal, where the power saving signal is used to indicate whether to wake up the terminal to perform the PDCCH monitoring within an On Duration time period of the DRX; performing, by the terminal, the PDCCH monitoring within the On Duration time period of the DRX when not monitoring the power saving signal.

7 Claims, 4 Drawing Sheets

(51) Int. Cl.
*H04W 52/02* (2009.01)
*H04W 72/23* (2023.01)
*H04W 80/02* (2009.01)

(58) Field of Classification Search
CPC ......... H04W 52/0235; H04W 52/0245; H04W 76/28; H04W 52/0229; Y02D 30/70
USPC .......................................................... 370/318
See application file for complete search history.

(56) References Cited

U.S. PATENT DOCUMENTS

| | | | | |
|---|---|---|---|---|
| 8,774,138 | B2* | 7/2014 | Ramos | H04W 72/52 |
| | | | | 370/336 |
| 8,923,178 | B2* | 12/2014 | Anderson | H04W 52/0222 |
| | | | | 370/252 |
| 9,986,452 | B2* | 5/2018 | Liu | H04L 43/16 |
| 10,004,099 | B2* | 6/2018 | Johansson | H04W 76/28 |
| 10,159,109 | B2* | 12/2018 | Kanesalingam | H04W 72/30 |
| 10,211,838 | B2* | 2/2019 | Liu | H03L 1/026 |
| 10,743,257 | B2* | 8/2020 | Liu | H04W 52/0229 |
| 10,863,436 | B2* | 12/2020 | Jeong | H04W 52/0216 |
| 10,966,155 | B1* | 3/2021 | Kasslin | H04W 76/28 |
| 10,986,572 | B2* | 4/2021 | Gan | H04W 52/02 |
| 11,032,047 | B2* | 6/2021 | Liu | H04W 52/0216 |
| 11,089,570 | B2* | 8/2021 | Yi | H04L 5/0055 |
| 11,258,570 | B2* | 2/2022 | Li | H04W 52/0229 |
| 11,284,428 | B2* | 3/2022 | Lim | H04W 52/0216 |
| 11,297,674 | B2* | 4/2022 | He | H04W 76/28 |
| 11,356,949 | B2* | 6/2022 | Xu | H04W 76/28 |
| 11,363,668 | B2* | 6/2022 | Tang | H04W 72/0466 |
| 11,483,866 | B2* | 10/2022 | Myung | H04L 5/00 |
| 11,503,639 | B2* | 11/2022 | Myung | H04W 74/0808 |
| 11,606,751 | B2* | 3/2023 | Lee | H04W 76/28 |
| 11,647,464 | B2* | 5/2023 | Reial | H04W 52/0235 |
| | | | | 370/311 |
| 2012/0275366 | A1* | 11/2012 | Anderson | H04W 52/0219 |
| | | | | 370/311 |
| 2013/0107781 | A1 | 5/2013 | Lu et al. | |
| 2015/0195780 | A1* | 7/2015 | Liu | H04W 52/0216 |
| | | | | 370/311 |
| 2015/0208462 | A1* | 7/2015 | Lee | H04W 72/23 |
| | | | | 370/311 |
| 2015/0230180 | A1* | 8/2015 | Lim | H04W 76/14 |
| | | | | 370/315 |
| 2018/0077688 | A1* | 3/2018 | Yi | H04W 16/14 |
| 2018/0084501 | A1* | 3/2018 | Mu | H04W 52/0235 |
| 2019/0254110 | A1* | 8/2019 | He | H04L 5/0048 |
| 2020/0029315 | A1* | 1/2020 | Lin | H04L 1/0075 |
| 2020/0367193 | A1* | 11/2020 | Cha | H04W 48/12 |
| 2021/0168781 | A1* | 6/2021 | Lee | H04W 72/23 |
| 2021/0321333 | A1* | 10/2021 | Miao | H04L 5/0053 |
| 2021/0321446 | A1* | 10/2021 | Lee | H04W 72/54 |
| 2021/0345124 | A1* | 11/2021 | Myung | H04W 16/14 |
| 2021/0368444 | A1* | 11/2021 | Wang | H04W 72/0453 |
| 2021/0400699 | A1* | 12/2021 | Nory | H04L 1/1819 |
| 2022/0210866 | A1* | 6/2022 | He | H04L 5/0048 |

FOREIGN PATENT DOCUMENTS

| | | |
|---|---|---|
| EP | 3641412 A1 | 4/2020 |
| EP | 3657863 A1 | 5/2020 |
| WO | 2018201397 A1 | 11/2018 |
| WO | 2018204799 A1 | 11/2018 |
| WO | 2019015458 A1 | 1/2019 |

OTHER PUBLICATIONS

CATT R1-1812642, UE Power saving schemes with power saving signal/channel/procedures, 3GPP TSG RAN WG1 Meeting #95, Nov. 16, 2018(Nov. 16, 2021).
The first Office Action of corresponding European application No. 19915485.7, dated Mar. 30, 2023.
The EESR of corresponding European application No. 19915485.7, dated Jan. 11, 2022.
CATT:"Summary of UE Power Saving Schemes", 3GPP Draft; R1-1901324_SUMMARY of AI-7 2 9 2 1 UE Adaptation_Power Saving Scheme, 3rd Generation Partnership Project (3GPP), Mobile Competence Centre; 650, Route Des Lucioles; F-06921 Sophia-Antipol, vol. RAN WG1, no. Taipei, Taiwan; Jan. 21, 2019-Jan. 25, 2019 Jan. 21, 2019(Jan. 21, 2019), XP051601264.

* cited by examiner

METHOD AND DEVICE FOR MONITORING PHYSICAL DOWNLINK CONTROL CHANNEL, AND TERMINAL

CROSS-REFERENCE TO RELATED APPLICATIONS

This application is a continuation of International Application No. PCT/CN2019/075243, filed on Feb. 15, 2019, the disclosure of which is hereby incorporated by reference in its entirety.

TECHNICAL FIELD

The present application relates to a field of communication, in particular, to a method and a device for monitoring a physical downlink control channel, an equipment and a system.

BACKGROUND

Discontinuous reception (DRX) is introduced into long-term evolution (LTE) for the sake of terminal power saving. A basic mechanism of DRX is to configure a DRX cycle for a user equipment (UE) in a radio resource control (RRC) connected state. Every DRX cycle is consisted of "On Duration" and "Opportunity for DRX". In the "On Duration" time (also referred to as: active period), the UE monitors and receives a physical downlink control channel (PDCCH); in the "Opportunity for DRX" time (also referred to as: dormant period), the UE does not receive the PDCCH to reduce power consumption.

In related technologies, power saving signals are introduced. If a base station judges that a UE needs to be scheduled within the "On Duration" time, a first power saving signal is sent to the UE, so that a terminal performs PDCCH monitoring within the "On Duration" time of the DRX; if the base station judges that the UE does not need to be scheduled within the "On Duration" time, a second power saving signal is sent to the UE, so that the terminal does not perform the PDCCH monitoring within the "On Duration" time of the DRX.

SUMMARY

The embodiments of the present application provide a method and a device for monitoring a physical downlink control channel, an equipment and a system, by which a problem that, how a terminal to perform subsequent processing when an abnormal reception is occurred during a cooperative working process of a power saving signal and a DRX, can be solved.

According to one aspect of the present application, a corresponding PDCCH monitoring behavior is defined based on a monitoring result of a power saving signal, and based on different trigger rules of the monitoring result. The "power saving signal" can also be called as a power-saving signal or a wake-up signal, which is not limited by the present application.

According to one aspect of the present application, there is provided a method for monitoring a PDCCH, the method including:

monitoring, by a terminal, a power saving signal, where the power saving signal is used to indicate whether to wake up the terminal to perform the PDCCH monitoring within an On Duration time period of a DRX; and performing, by the terminal, the PDCCH monitoring within the On Duration time period of the DRX when not monitoring the power saving signal.

In a possible implementation, the method of monitoring, by a terminal, a power saving signal includes:

monitoring, by the terminal, whether an energy of the power saving signal exceeds a threshold value corresponding to a sequence signal when the power saving signal adopts a sequence signal; if the threshold value is exceeded, it is considered that the power saving signal is detected; if the threshold value is not exceeded, it is considered that the power saving signal is not detected: and monitoring, by the terminal, whether a cyclic redundancy check (CRC) of the power saving signal is successful when the power saving signal adopts a control channel based on an error-correction coding; if the CRC is successful, it is considered that the power saving signal is detected; if the CRC fails, it is considered that the power saving signal is not detected.

According to another aspect of the present application, there is provided a method for monitoring a PDCCH, the method including:

monitoring, by a terminal, a power saving signal, where the power saving signal is used to indicate whether to wake up the terminal to perform the PDCCH monitoring within an On Duration time period of a discontinuous reception DRX;

performing, by the terminal, the PDCCH monitoring within the On Duration time period of the DRX when the monitoring result of the power saving signal indicates to wake up the terminal to perform the PDCCH monitoring within the On Duration time period of the DRX; and starting, by the terminal, a target timer when an On Duration timer of the DRX expires and when not monitoring the PDCCH within the On Duration time period of the DRX, and performing the PDCCH monitoring before the target timer expires.

According to another aspect of the present application, there is provided a method for monitoring PDCCH, the method including:

monitoring, by a terminal, a power saving signal, where the power saving signal is used to indicate whether to wake up the terminal to perform the PDCCH monitoring within an On Duration time period of a discontinuous reception DRX;

performing, by the terminal, the PDCCH monitoring within the On Duration time period of the DRX when the monitoring result of the power saving signal indicates to wake up the terminal to perform the PDCCH monitoring within the On Duration time period of the discontinuous reception DRX; and entering, by the terminal, the DRX when not monitoring the PDCCH within the On Duration time period of the DRX.

According to one aspect of the present application, there is provided a device for monitoring a PDCCH, the device including:

a receiving module, configured to monitor a power saving signal, where the power saving signal is used to indicate whether to wake up the terminal to perform the PDCCH monitoring within an On Duration time period of a discontinuous reception DRX; and a processing module, configured to perform the PDCCH monitoring within the On Duration time period of the DRX when the power saving signal is not detected by the receiving module.

According to another aspect of the present application, there is provided a device for monitoring PDCCH, the device including:

a receiving module, configured to monitor a power saving signal, where the power saving signal is used to indicate whether to wake up the terminal to perform the PDCCH monitoring within an On Duration time period of a discontinuous reception DRX;

where the receiving module is further configured to perform the PDCCH monitoring within the On Duration time period of the DRX when the monitoring result of the power saving signal indicates to wake up the terminal to perform the PDCCH monitoring within the On Duration time period of the discontinuous reception DRX; and a processing module, configured to start a target timer when an On Duration timer period of the DRX expires and when not monitoring the PDCCH within the On Duration time period of the DRX, and perform the PDCCH monitoring before the target timer expires.

According to another aspect of the present application, there is provided a device for monitoring physical downlink control channel PDCCH, the device including:

a receiving module, configured to monitor a power saving signal, where the power saving signal is used to indicate whether to wake up the terminal to perform the PDCCH monitoring within an On Duration time period of a discontinuous reception DRX;

the receiving module, configured to perform the PDCCH monitoring within the On Duration time period of the DRX when the monitoring result of the power saving signal indicates to wake up the terminal to perform the PDCCH monitoring within the On Duration time period of the discontinuous reception DRX; and a processing module, configured to enter the DRX when not monitoring the PDCCH within the On Duration time period of the DRX.

According to another aspect of the present application, a terminal is provided, the terminal including a processor and a memory, where the memory stores at least one instruction, and the at least one instruction is used to be executed by the processor to implement the method for monitoring PDCCH provided by the above aspects.

According to another aspect of the present application, there is provided a computer-readable storage medium, the storage medium stores at least one instruction, and the at least one instruction is used to be executed by a processor to implement the method for monitoring PDCCH provided by the above aspects.

The technical solution provided by the embodiments of the present application at least has the following beneficial effects:

As there is a certain probability of miss-monitoring in the receiving process of the terminal, when the power saving signal is not detected by the terminal, the PDCCH monitoring is performed within the On Duration time period of the DRX, which can avoid a risk that the base station cannot effectively schedule the terminal resulted by that the terminal does not monitor the PDCCH even if the miss-monitoring happens.

BRIEF DESCRIPTION OF DRAWINGS

In order to explain technical solutions in the embodiments of the present application 34) more clearly, drawings used in description of the embodiments will be briefly introduced below. Obviously, the drawings in the following description are only some embodiments of the present application, and for those of ordinary skills in the art, other drawings can be obtained according to these drawings without making creative efforts.

BRIEF DESCRIPTION OF EMBODIMENTS

In order to make purposes, technical solutions and advantages of the present application clearer, the embodiments of the present application will be further described in detail with reference to the accompanying drawings.

The "module" mentioned herein generally refers to programs or instructions stored in a memory, where the programs and instructions are able to implement certain functions; the "unit" mentioned herein generally refers to functional structures divided according to logic, and the "unit" can be implemented by pure hardware, or a combination of software and hardware.

The "plural" mentioned herein refers to two or more. The "and/or", which describes relationships between related objects, represents that there can exist three kinds of relationships, for example, A and/or B can represents three situations, which are A existing alone, A and B existing at the same time, and B existing alone. The character "/" generally represents that context objects have a relationship of "or". The words "first", "second" and similar words used in the specification and claims of the present application do not represent any order, quantity or importance, but are only used to distinguish different components.

Figure 1:
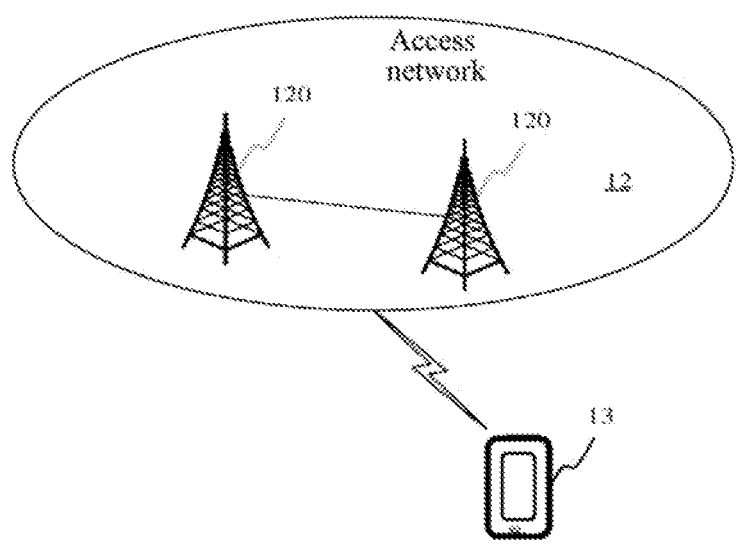
FIG. 1 is a schematic structural diagram of a mobile communication system provided by an illustrative embodiment of the present application.

FIG. 1 shows a block diagram of a communication system provided by an illustrative embodiment of the present application. The communication system may be a 5G NR system. The communication system includes an access network 12 and a terminal 13.

A plurality of access network devices 120 is included in the access network 12. The access network devices 120 and a core network device 110 communicate with each other through a certain interface technology, for example an Si interface in a LTE system and an NR interface in a 5G NR system. The access network devices 120 may be a base station, where the base station is a device deployed in an access network to provide a wireless communication function for a terminal. The base station may include various forms of macro base station, micro base station, relay station, access point, and the like. In a system with different wireless access technologies adopted, names of equipments having base station functions may be different, for example, in LTE systems, the equipments are called eNodeB or eNB: in 5G NR systems, the equipments are called gNodeB or gNB. With the evolution of communication technology, the description of a name "base station" may change. For the convenience of the embodiment of the present disclosure, the above-mentioned devices for providing wireless communication functions for terminals are collectively referred to as access network devices.

A terminal 13 may include various handheld equipments, vehicle-mounted equipments, wearable equipments, computing equipments having wireless communication functions or other processing equipments connected to wireless modems, and various forms of user equipments (UE), mobile stations (MS), terminals (terminal device), and so on. For convenience of description, the above-mentioned equipments are collectively referred to as terminals. The access network devices 120 and the terminal 13 communicate with each other through a certain air interface technology, such as a Uu interface.

DRX Mechanism

DRX can make a terminal periodically enter Opportunity for DRX at some time without monitoring PDCCH scheduling information (or called as PDCCH subframe). And when the terminal needs to monitor the PDCCH scheduling information, the terminal is waken up from the Opportunity for DRX, so that a UE can achieve a purpose of saving power.

A basic mechanism of a DRX is to configure a DRX cycle for terminals in a RRC_CONNECTED state. The DRX cycle is consisted of "On Duration" and "Opportunity for DRX": within the time of the "On Duration", the terminal monitors and receives the PDCCH scheduling information: during the time of the "Opportunity for DRX", the UE does not receive data of a downlink channel to save power consumption. It can be seen from FIG. 2 that in time domain, time is divided into successive DRX cycles (Cycle) one by one. When the terminal receives a scheduling message during the "On Duration", the terminal will start a DRX-inactivity Timer and monitor the PDCCH scheduling information in every subframe during the period; if the DRX-inactivity Timer timer is running, even if the originally configured On Duration time period has ended, the terminal still needs to continue monitoring downlink PDCCH subframe until the DRX Inactivity Timer timer expires. In addition, a transmission of paging message is also a DRX mechanism in an RRC idle state, and at this time, the DRX cycle is a cycle of paging message.

Figure 2:
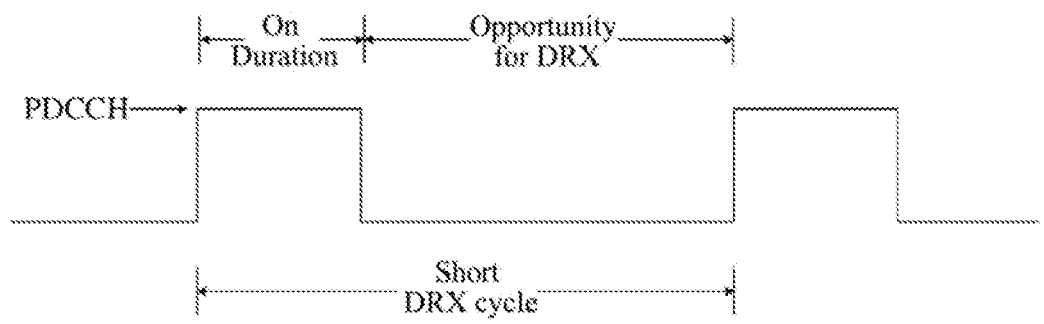
FIG. 2 is a schematic cycle diagram of a DRX mechanism relating to the present application.
Figure 3:
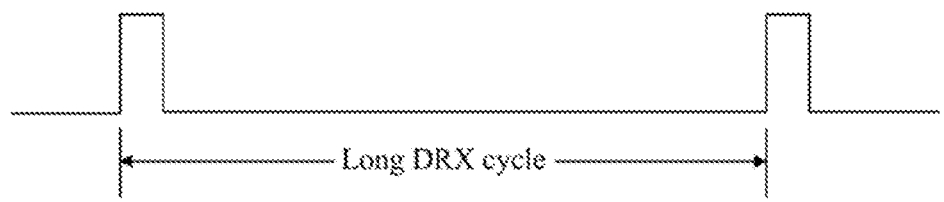
FIG. 3 is a schematic cycle diagram of a long DRX cycle and a short DRX cycle relating to the present application.

A DRX cycle is equal to a sum of wake-up time and dormant time of the terminal, where the wake-up time is duration of On Duration in one cycle, and the dormant time is duration of an Opportunity for DRX in one cycle. In a communication system, the system can respectively configure a short DRX cycle, as shown in FIG. 2, or a long DRX cycle, as shown in FIG. 3, for terminals according to different service scenarios. An Opportunity for DRX of the long DRX cycle is longer than an Opportunity for DRX of the short DRX cycle, or a proportion of the dormant duration of the long DRX cycle is greater than a proportion of the dormant duration of the short DRX cycle.

However, although the access network has configured the DRX mechanism for the terminal, the terminal is only scheduled opportunistically during the periodic On Duration, and even under the condition of low traffic load of the terminal, the terminal will be scheduled within only a few DRX cycles; for a paging message adopting the DRX mechanism, there are fewer opportunities for a terminal to receive the paging message. Therefore, after the terminal is configured with the DRX mechanism, there still exit that no data scheduling is detected for majority of PDCCH monitorings within On Duration, so there is space for further optimization.

A power saving signal (also called electricity-saving signal) is introduced in related technologies. If an access network device judges that a UE needs to be scheduled within the "On Duration" time, a first power saving signal is sent to the UE, so that a terminal performs PDCCH monitoring within the "On Duration" time of the DRX; if the access network device judges that the UE does not need to be scheduled within the "On Duration" time, a second power saving signal is sent to the UE, so that the terminal does not perform the PDCCH monitoring within the "On Duration" time of the DRX.

Adopting a power saving signal indication method can effectively implement power saving of a terminal. However, there are some special circumstances need to be considered in the mechanism, such as there is a certain probability of miss-monitoring for the power saving signal, and when the access network sends a power saving signal but the power saving signal is not received by the terminal, a behavior of the terminal needs to be further clarified. Therefore, the present application provides the following embodiments.

Figure 4:
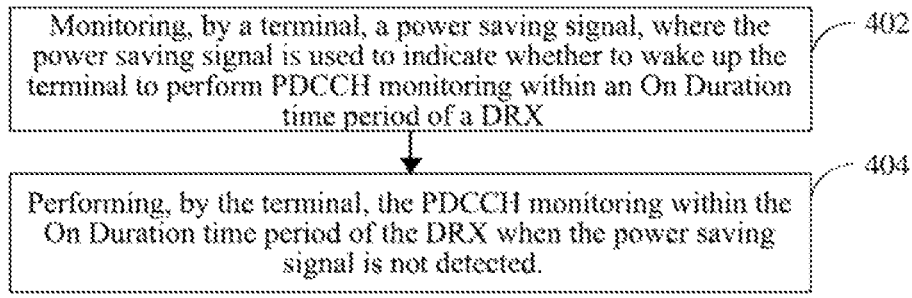
FIG. 4 is a flowchart of a method for monitoring PDCCH provided by another illustrative embodiment of the present application.

FIG. 4 shows a flowchart of a method for monitoring a PDCCH provided by an exemplary embodiment of the present application. The method can be performed by a terminal in FIG. 1. The method includes:

step 402, monitoring, by a terminal, a power saving signal, where the power saving signal is used to indicate whether to wake up the terminal to perform the PDCCH monitoring within an On Duration time period of a DRX; and step 404, performing, by the terminal, the PDCCH monitoring within the On Duration time period of the DRX when not monitoring the power saving signal.

To sum up, in the method provided by the present embodiment, as there is a certain probability of miss-monitoring in a receiving process of a terminal, when a power saving signal is not detected by the terminal, PDCCH monitoring is performed within the On Duration time period of a DRX, which can avoid a risk that a base station cannot effectively schedule the terminal resulted by that the terminal does not monitor the PDCCH even if the miss-monitoring happens.

Figure 5:
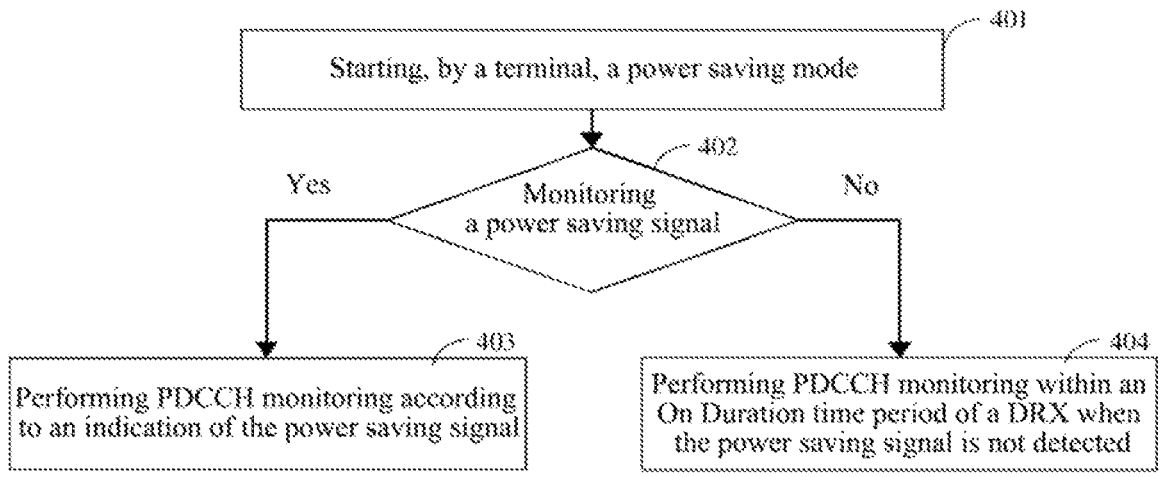
FIG. 5 is a flowchart of a method for monitoring PDCCH provided by another illustrative embodiment of the present application.

FIG. 5 shows a flowchart of a method for monitoring PDCCH provided by another exemplary embodiment of the present application. The present embodiment is an optional embodiment based on FIG. 4, and the method can be performed by the terminal in FIG. 1. The method includes:

step 401, starting, by a terminal, a power saving mode; and sending, by an access network device, a signaling to the terminal, where the signaling is used to control the terminal to start the power saving mode. The signaling may be radio resource control (RRC), medium access control control element (MAC CE).

The terminal receives the signaling and starts the power saving mode according to the signaling.

Step 402, monitoring, by a terminal, a power saving signal, where the power saving signal is used to indicate whether to wake up the terminal to perform the PDCCH monitoring within an On Duration time period of a DRX; and where the power saving signal includes a first power saving signal and a second power saving signal. The first power saving signal is used to indicate to wake up the terminal to perform the PDCCH monitoring within the On Duration time period of the DRX, and the second power saving signal is used to indicate not to wake up the terminal to perform the PDCCH monitoring within the On Duration time period of the DRX.

In an embodiment, the power saving signal is a monitoring signal with low power consumption.

In an embodiment, the power saving signal is a ZC (Zadoff-chu) sequence. The first power saving signal is a first ZC sequence, and the second power saving signal is a second ZC sequence. At this time, methods of monitoring a power saving signal by a terminal includes: the terminal monitors whether the energy of the power saving signal exceeds a threshold value corresponding to the ZC sequence; if the threshold value is exceeded, it is considered that the power saving signal is detected; if the threshold value is not exceeded, it is considered that the power saving signal is not detected.

In an embodiment, the power saving signal is a PDCCH. The first power saving signal is that a preset bit value in downlink control information (DCI) is 1, and the second power saving signal is that a preset bit value in a DCI is 0. At this time, the method of monitoring a power saving signal by the terminal includes:

monitoring, by the terminal, whether a CRC of a PDCCH carried with a DCI is successful; if the CRC is successful, it is considered that the power saving signal is detected: if the CRC fails, it is considered that the power saving signal is not detected.

In an embodiment, the terminal starts the power saving mode according to the configuration information of the power saving signal. After the power saving mode is started, the terminal monitors the power saving signal (or monitors the power saving signal) in a time-frequency resource position configured by the configuration information. In an embodiment, the time-frequency resource position is a periodically occurring resource position, and each time-frequency resource position is located prior to the corresponding On Duration time period of the DRX.

The configuration information of the power saving signal includes: at least one of time-frequency resource position corresponding to the power saving signal, sequence setting (the ZC sequence is adopted as the power saving signal), and radio-network temporary identifier (RNTI) scrambled by the PDCCH (the PDCCH is adopted as the power saving signal). The configuration information can be predefined by a communication protocol, or can be pre-configured to the terminal, or can be sent to the terminal by the network through high layer signaling.

Step 403, performing the PDCCH monitoring according to an indication of the power saving signal when monitoring the power saving signal.

When the power saving signal is the first power saving signal, the terminal is waken up within the next On Duration time period of the DRX, and performs the PDCCH monitoring in the On Duration time period. That is, the first power saving signal is used to indicate that the PDCCH monitoring is performed within the On Duration time period.

When the power saving signal is the second power saving signal, the terminal is not waken up within the next On Duration time period of the DRX, and performing the PDCCH monitoring is ignored within the On Duration time period. That is, the second power saving signal is used to indicate that performing the PDCCH monitoring is ignored within the On Duration time period.

Step 404, performing, by the terminal, the PDCCH monitoring within the On Duration time period of the DRX when not monitoring the power saving signal.

The access network device will send the power saving signal to the terminal at the configured time-frequency resource position, but when the terminal miss-monitors, the power saving signal is not detected by the terminal in the time-frequency resource position. If the power saving signal is not detected by the terminal, the PDCCH monitoring is performed within the On Duration time period of the DRX.

Where, the reasons why the power saving signal is not detected by the terminal include: when receiving the power saving signal, the terminal suddenly faces deep channel fading, which leads to the miss-monitoring of the power saving signal; or, the terminal faces sudden strong interference from neighboring cells, which leads to miss-monitoring of power saving signal.

The above-mentioned "On Duration time period", also called "duration period", refers to a running period of the On Duration Timer of the DRX.

To sum up, in the method provided by the present embodiment, as there is a certain probability of miss-monitoring in a receiving process of a terminal, when a power saving signal is not detected by the terminal, PDCCH monitoring is performed within the On Duration time period of a DRX, which can avoid a risk that a base station cannot effectively schedule the terminal resulted by that the terminal does not monitor the PDCCH even if the miss-monitoring happens.

When the power saving signal and the DRX cooperatively work, there may be another abnormal reception situation: when the monitoring result of the power saving signal indicates to wake-up the terminal, the terminal performs the PDCCH monitoring within the On Duration time period of the DRX, but the PDCCH is not detected by the terminal within the On Duration time period of the DRX.

The reasons why the PDCCH is not detected by the terminal within the On Duration time period of the DRX may be as the following two reasons:

1. The access network device actually sends the PDCCH schedule to the terminal, but the PDCCH schedule is not detected by the terminal due to the reason of channel fading or interference of peripheral signal, and the like.

2. The access network device expects to schedule data to the terminal, but the data scheduling of the terminal is delayed due to the high priority data transmission of other terminals, which leads to that the access network device does not have enough time to schedule during the the DRX On-Duration of the terminal.

Aiming at the above-mentioned reason 1, the embodiments of the present application further provides following embodiment.

Figure 6:
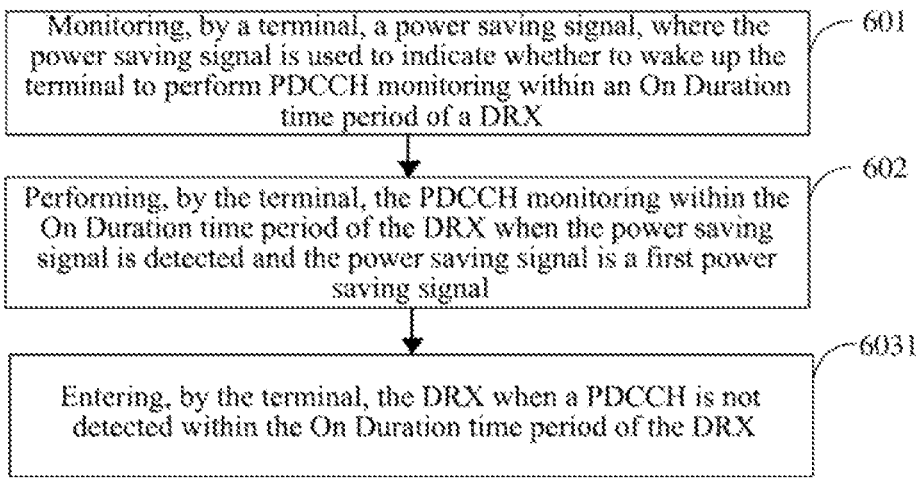
FIG. 6 is a flowchart of a method for monitoring PDCCH provided by another illustrative embodiment of the present application.

FIG. 6 shows a flowchart of a method for monitoring a PDCCH provided by an illustrative embodiment of the present application. The method can be performed by a terminal in FIG. 1. The method includes:

Step 601, monitoring, by a terminal, a power saving signal, where the power saving signal is used to indicate whether to wake up the terminal to perform the PDCCH monitoring during On Duration time of a DRX;

entering S602 when the monitoring result of the power saving signal indicates to wake up the terminal to perform the PDCCH monitoring within the On Duration time period of the DRX; and ignoring performing the PDCCH monitoring when the monitoring result of the power saving signal indicates not to wake up the terminal to perform the PDCCH monitoring within the On Duration time period of the DRX;

Step 602, performing, by the terminal, the PDCCH monitoring within the On Duration time period of the DRX when the monitoring result of the power saving signal indicates to wake up the terminal to perform the PDCCH monitoring within the On Duration time period of the DRX;

Step 6031, entering, by the terminal, the DRX when not monitoring the PDCCH within the On Duration time period of the DRX.

The terminal enters the DRX when the DRX-On Duration Timer expires, and expects that the access network device initiates new scheduling to the terminal within the subsequent On Duration time period of the DRX.

To sum up, in the method provided by the present embodiment, by entering the DRX when not monitoring the PDCCH, the terminal may receive the scheduling of the access network device within the subsequent On Duration time period of the DRX. Although the method leads to that the transmission of the terminal is delayed to the next DRX cycle, it reduces the power consumption of the terminal to continue monitoring the PDCCH to a certain extent, which is beneficial to the power-saving of the terminal.

Aiming at the above-mentioned reason 2, the embodiments of the present application further provide following embodiment.

Figure 7:
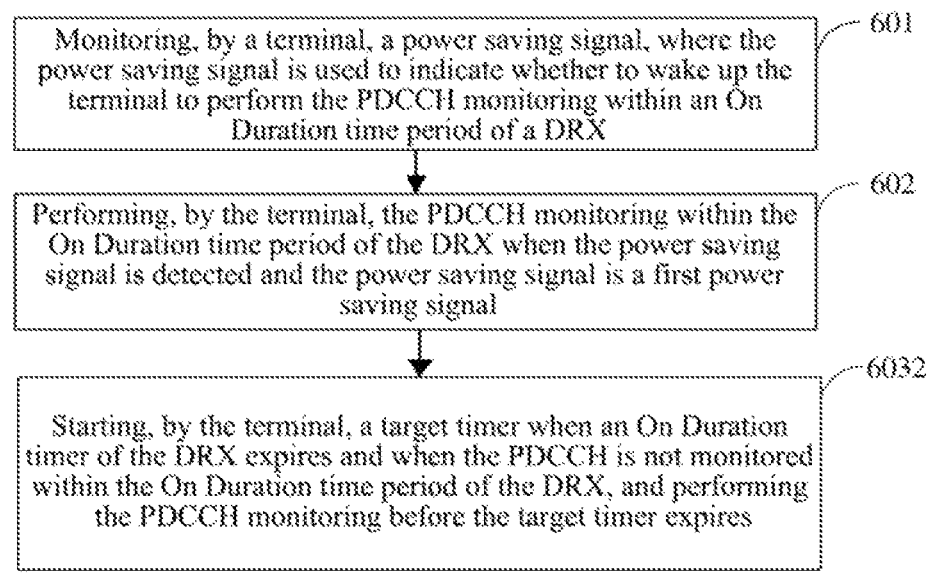
FIG. 7 is a flowchart of a method for monitoring PDCCH provided by another illustrative embodiment of the present application.

FIG. 7 shows a flowchart of a method for monitoring a PDCCH provided by an illustrative embodiment of the present application. The method can be performed by a terminal in FIG. 1. The method includes:

Step 601, monitoring, by a terminal, a power saving signal, where the power saving signal is used to indicate whether to wake up the terminal to perform the PDCCH monitoring within an On Duration time period of a Discontinuous Reception DRX;

entering S602 when the monitoring result of the power saving signal indicates to wake up the terminal to perform the PDCCH monitoring within the On Duration time period of the DRX; and ignoring performing the PDCCH monitoring when the monitoring result of the power saving signal indicates not to wake up the terminal to perform the PDCCH monitoring within the On Duration time period of the DRX;

Step 602, performing, by the terminal, PDCCH monitoring within the On Duration time of the DRX when the monitoring result of the power saving signal indicates to wake up the terminal to perform the PDCCH monitoring within the On Duration time of the DRX; and Step 6032, starting, by the terminal, a target timer when an On Duration timer of the DRX expires and when not monitoring the PDCCH within the On Duration time period of the DRX, and performing the PDCCH monitoring before the target timer expires.

In an embodiment, the target timer is: a DRX-inactivity Timer, or a first timer. The first timer is a newly added timer different from the inactivity timer.

In an embodiment, starting the DRX-inactivity Timer when a DRX-On Duration Timer expires, and performing the PDCCH monitoring before the DRX-inactivity Timer expires.

In an embodiment, starting a first timer when an On Duration timer of the DRX expires, and performing the PDCCH monitoring before the first timer expires, and the first timer is a timer different from the DRX-inactivity Timer.

To sum up, in the method provided in the present embodiment, after the DRX-On Duration Timer of the terminal expires, a target timer is started to continue monitoring the PDCCH, which is equivalent to prolonging the monitoring time of the PDCCH at this time. If the access network device sends data scheduling to the terminal after transmitting the data with high priority of other terminals, the terminal can receive and check the data scheduling in time, so that the terminal can receive the PDCCH scheduling in time as soon as possible.

In an optional embodiment based on FIG. 7, the target timer adopts a first timer. In Step 702, the terminal performs the PDCCH monitoring by adopting a first PDCCH search space within the On Duration time period of the DRX; in Step 703, before the first timer expires, the terminal performs the PDCCH monitoring by adopting a second PDCCH search space, where the second PDCCH search space is different from the first PDCCH search space.

In an embodiment, the second PDCCH search space is configured in advance by the access network. That is, before Step 703, the terminal receives a configuration signaling of the access network device, where the configuration signaling is used to configure the second PDCCH search space. Where the configuration signaling includes RRC or MAC CE.

It should be noted that for the embodiments shown in FIG. 6 and FIG. 7, the implementation of power saving signals includes three possible situations:

1. The power saving signal includes a first power saving signal and a second power saving signal, where the first power saving signal is used to indicate to wake up the terminal to perform the PDCCH monitoring within the On duration period of the DRX; and the second power saving signal is used to indicate not to wake up the terminal to perform the PDCCH monitoring within the On duration period of the DRX.

In the implementation, when the monitoring result for the power saving signal by the terminal is the "first power saving signal", the power saving signal is used to indicate to wake up the terminal to perform the PDCCH monitoring within the On Duration time period of the DRX; when the monitoring result for the power saving signal by the terminal is "second power saving signal", the power saving signal is used to indicate not to wake up the terminal to perform the PDCCH monitoring within the On Duration time period of the DRX.

2. There is one power saving signal, which is used to indicate to wake up the terminal to perform the PDCCH monitoring within the On Duration period of the DRX when the power saving signal is sent by the access network device; when the power saving signal is not sent by the access network device, the power saving signal is used to indicate not to wake up the terminal to perform the PDCCH monitoring within the On duration period of the DRX.

In the implementation, when the monitoring result for the power saving signal by the terminal is "power saving signal is detected", it is used to indicate to wake up the terminal to perform the PDCCH monitoring within the On Duration time period of the DRX; when the monitoring result for the power saving signal by the terminal is "power saving signal is not detected", it is used to indicate not to wake up the terminal to perform the PDCCH monitoring within the On Duration time period of the DRX.

3. There is one power saving signal, when the power saving signal is sent by the access network device, it is used to indicate not to wake up the terminal to perform the PDCCH monitoring within the On duration period of the DRX; when the power saving signal is not sent by the access network device, it is used to indicate to wake up the terminal to perform the PDCCH monitoring within the On duration period of the DRX.

In the implementation, when the monitoring result for the power saving signal by the terminal is "power saving signal is not detected", it is used to indicate to wake up the terminal to perform the PDCCH monitoring within the On Duration time period of the DRX; when the monitoring result for the power saving signal by the terminal is "power saving signal is detected", it is used to indicate not to wake up the terminal to perform the PDCCH monitoring within the On Duration time period of the DRX.

It should be noted that for the second reason, the technical solution provided by the embodiment of FIG. 6 may also be adopted.

It should be noted that the embodiment of FIG. 6 (and optional embodiments based on FIG. 6) can also be combined with the embodiment of FIG. 4 (and optional embodiments based on FIG. 4) to implement as new embodiments, and the embodiment of FIG. 7 (and optional embodiments based on FIG. 7) can also be combined with the embodiment of FIG. 4 (and optional embodiment based on FIG. 4) to implement as new embodiments.

Figure 8:
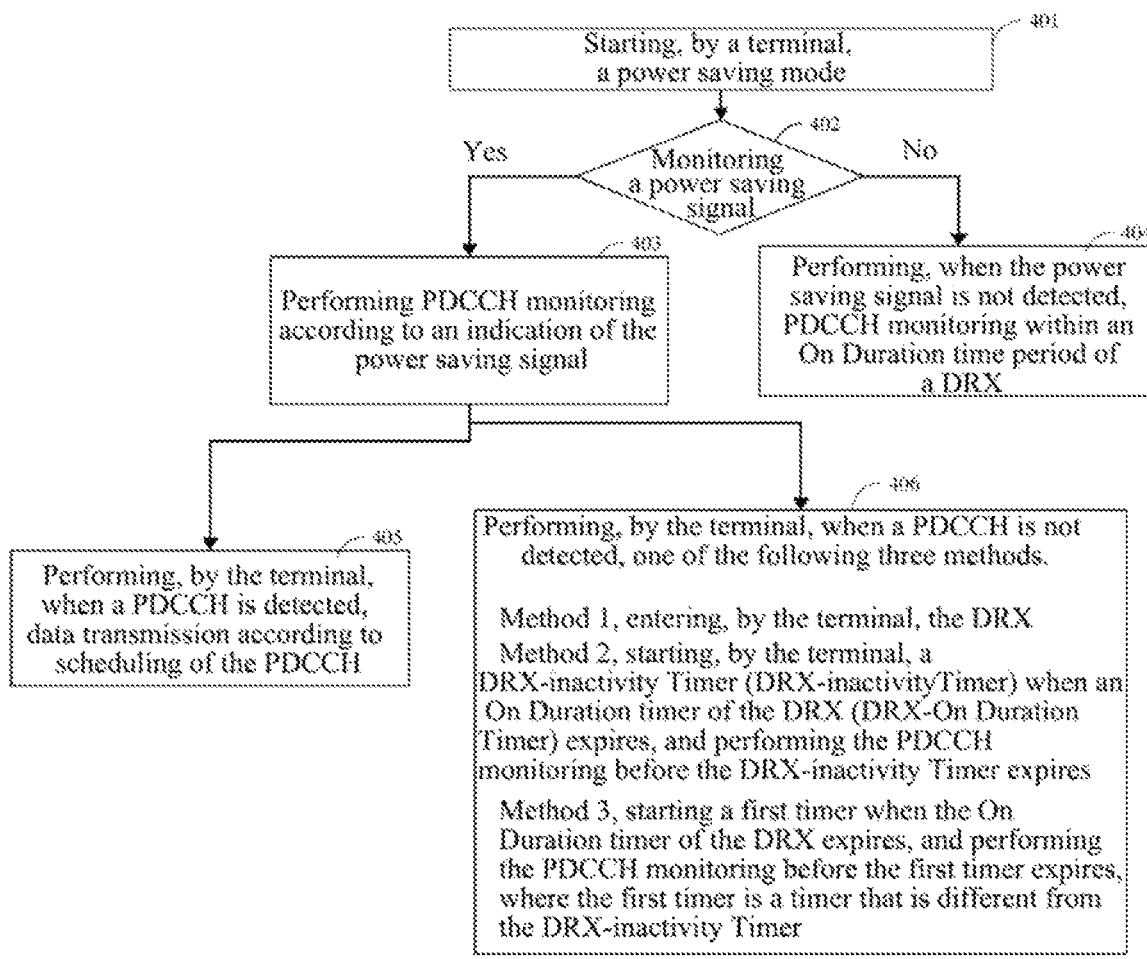
FIG. 8 is a flowchart of a method for monitoring PDCCH provided by another illustrative embodiment of the present application.

FIG. 8 shows a flowchart of a method for monitoring PDCCH provided by another illustrative embodiment of the present application. The method can be performed by a terminal in FIG. 1. The method includes:

S401, starting, by a terminal, a power saving mode: and
S402, monitoring, by a terminal, a power saving signal, where the power saving signal is used to indicate whether to wake up the terminal to perform the PDCCH monitoring within an On Duration time period of a DRX;
When the power saving signal is detected, S403 is entered; when the power saving signal is not detected, S404 is entered.
S403, performing the PDCCH monitoring according to an indication of the power saving signal when monitoring the power saving signal.
When a PDCCH is detected, S405 is entered; when the PDCCH is not detected, S406 is entered.
S404, performing, by the terminal, the PDCCH monitoring within the On Duration time period of the DRX when not monitoring the power saving signal.
S405, transmitting, by the terminal, data according to a scheduling of the PDCCH when monitoring the PDCCH;
S406, performing, by the terminal, one of the following three methods when not monitoring the PDCCH.
Method 1, entering, by the terminal, the DRX.
Method 2, starting, by the terminal, a DRX-inactivity Timer when an On Duration timer of the DRX (DRX-On Duration Timer) expires, and performing the PDCCH monitoring before the DRX-inactivity Timer expires.

Method 3, starting a first timer when the On Duration timer of the DRX expires, and performing the PDCCH monitoring before the first timer expires, where the first timer is a timer that is different from the DRX-inactivity Timer.

The following are device embodiments of the present application. Since the device embodiments correspond to the method embodiments one by one, for details not described in detail in the device embodiments, reference can be made to the above method embodiments.

Figure 9:
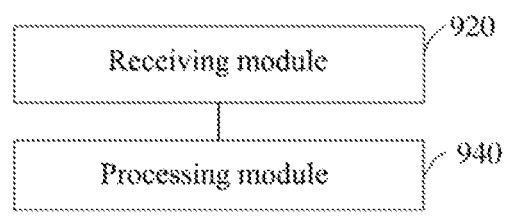
FIG. 9 is a block diagram of a device for monitoring PDCCH provided by another illustrative embodiment of the present application.

FIG. 9 shows a block diagram of a device for monitoring PDCCH provided by an illustrative embodiment of the present application. The device can be implemented as a part of the terminal by hardware or a combination of software and hardware. The device includes:

a receiving module 920, configured to monitor a power saving signal, where the power saving signal is used to indicate whether to wake up the terminal to perform the PDCCH monitoring within an On Duration time period of a discontinuous reception DRX;

a processing module 940, configured to perform the PDCCH monitoring within an On Duration time period of the DRX when the power saving signal is not detected by the receiving module.

In an optional embodiment, the processing module 940 is further configured to perform the PDCCH monitoring according to an indication of the power saving signal when the power saving signal is detected by the receiving module.

In an optional embodiment, the processing module 940 is further configured to perform the PDCCH monitoring within the On Duration time period of the DRX when the power saving signal is a first power saving signal; when the power saving signal is a second power saving signal, the terminal ignores the PDCCH monitoring within the On Duration time period of the DRX.

In an optional embodiment, the processing module 940 is further configured to, when the power saving signal is a first power saving signal, after the PDCCH monitoring is performed within the On Duration time period of the DRX, when the PDCCH is not detected within the On Duration time period of the DRX, enter the DRX.

In an optional embodiment, the processing module 940 is further configured to start, when the power saving signal is the first power saving signal, after the PDCCH monitoring is performed within the On Duration time period of the DRX, when the PDCCH is not detected within the On Duration time period of the DRX, a target timer when the On Duration timer of the DRX expires, and perform the PDCCH monitoring before the target timer expires.

In an optional embodiment, the processing module 940 is further configured to, when the power saving signal is the first power saving signal, after the PDCCH monitoring is performed within the On Duration time period of the DRX, when the PDCCH is not detected within the On Duration time period of the DRX, start the DRX-inactivity Timer when the On Duration timer of the DRX expires, and perform the PDCCH monitoring before the DRX-inactivity Timer expires; or the processing module 940 is further configured to, when the power saving signal is the first power saving signal, after the PDCCH monitoring is performed within the On Duration time period of the DRX, when the PDCCH is not detected within the On Duration time period of the DRX, start the first timer when the On Duration timer of the DRX expires, and perform the PDCCH monitoring before the first timer expires, where the first timer is a timer different from the DRX-inactivity Timer.

In an optional embodiment, the receiving module 920 is configured to, when the power saving signal is not detected by the receiving module, perform the PDCCH monitoring by adopting a first PDCCH searching space within the On Duration time period of the DRX; the receiving module is further configured to perform the PDCCH monitoring by adopting the second PDCCH searching space before the first timer expires, where the second PDCCH searching space is different from the first PDCCH searching space.

In an optional embodiment, the receiving module 920 is further configured to receive a configuration signaling of the access network device, where the configuration signaling is used to configure the second PDCCH searching space;

where the configuration signaling includes RRC or MAC CE.

In an optional embodiment, a receiving module 920 is configured to monitor a power saving signal, where the power saving signal is used to indicate whether to wake up the terminal to perform the PDCCH monitoring within the On Duration time period of a discontinuous reception DRX;

wherein the receiving module 920 is further configured to perform the PDCCH monitoring within the On Duration time period of the DRX when the monitoring result of the power saving signal indicates to wake up the terminal to perform the PDCCH monitoring within the On Duration time period of the discontinuous reception DRX;

a processing module 940, configured to start, when the PDCCH is not detected within the On Duration time period of the DRX, a target timer when the On Duration timer of the DRX expires, and perform the PDCCH monitoring before the target timer expires.

In an optional embodiment, the processing module 940 is configured to, when the PDCCH is not detected within the On Duration time period of the DRX, start the DRX-inactivity Timer when the On Duration timer of the DRX expires, and perform the PDCCH monitoring before the DRX-inactivity Timer expires: or the processing module 940 is further configured to, when the PDCCH is not detected within the On Duration time period of the DRX, start the first timer before the On Duration timer of the DRX expires, and perform the PDCCH monitoring before the first timer expires, where the first timer is a timer different from the inactivity timer.

In an optional embodiment, the receiving module 920 is configured to, when the power saving signal is not detected by the receiving module, perform the PDCCH monitoring by adopting a first PDCCH searching space within the On Duration time period of the DRX; or the receiving module 920 is further configured to perform the PDCCH monitoring by adopting the second PDCCH searching space before the first timer expires, where the second PDCCH searching space is different from the first PDCCH searching space.

In an optional embodiment, the receiving module 920 is further configured to receive a configuration signaling of the access network device, where the configuration signaling is used to configure the second PDCCH searching space;

where the configuration signaling includes radio resource control RCC or media access control control element MAC CE.

In an optional embodiment, the receiving module 920 is configured to perform the PDCCH monitoring within the On Duration time period of the DRX when the power saving signal is detected and the power saving signal is a first power saving signal; the first power saving signal is used to indicate to wake up the terminal to perform the PDCCH monitoring within the On Duration time period of the DRX;

or, the receiving module 920 is configured to, when the power saving signal is detected, perform the PDCCH monitoring within the On Duration time period of the DRX; the power saving signal, when being sent by the access network device, is used to indicate to wake up the terminal to perform the PDCCH monitoring within the On Duration time period of the DRX;

or, the receiving module 920 is configured to, when the power saving signal is not detected, perform the PDCCH monitoring within the On Duration time period of the DRX; when the power saving signal is not sent by the access network device, it is used to indicate to wake up the terminal to perform the PDCCH monitoring within the On Duration time period of the DRX.

In an optional embodiment, a receiving module 920 is configured to monitor a power saving signal, where the power saving signal is used to indicate whether to wake up the terminal to perform the PDCCH monitoring within the On Duration time period of the DRX;

the receiving module 920, configured to perform the PDCCH monitoring within the On Duration time period of the DRX when the monitoring result of the power saving signal indicates to wake up the terminal to perform the PDCCH monitoring within the On Duration time period of the discontinuous reception DRX;

a processing module 940, configured to, when the PDCCH is not detected within the On Duration time period of the DRX, enter the DRX.

The above-mentioned receiving module 920 and/or processing module 940 can be implemented by a communication chip.

Figure 10:
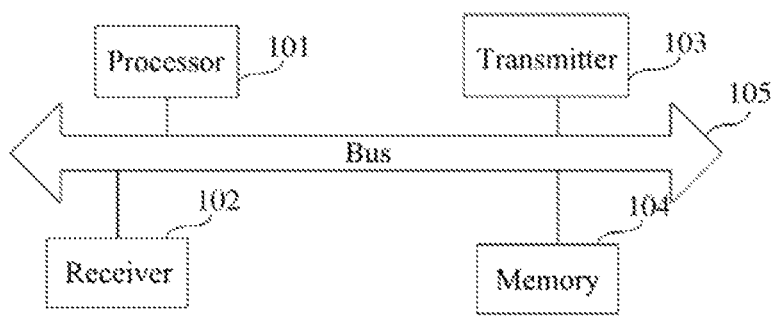
FIG. 10 is a structural block diagram of an access network device provided by another illustrative embodiment of the present application.

Please refer to FIG. 10, FIG. 10 shows a structural schematic diagram of a terminal provided by an exemplary embodiment of the present application, where the terminal includes: a processor 101, a receiver 102, a transmitter 103, a memory 104 and a bus 105.

The processor 101 includes one or more processing cores, and the processor 101 executes various functional applications and information processing by running software programs and modules.

The receiver 102 and the transmitter 103 can be implemented as a communication component, and the communication component can be a piece of communication chip.

The memory 104 and the processor 101 are connected through the bus 105.

The memory 104 can be configured to store at least one instruction, and the processor 101 is configured to execute the at least one instruction, to implement the each step executed by the terminal in the above method embodiments.

In addition, the memory 104 can be implemented by any type of volatile or nonvolatile memory device or a combination thereof, the volatile or nonvolatile memory device includes but is not limited to: a magnetic disk or an optical disk, an electrically erasable programmable read-only memory (EEPROM), an erasable programmable read-only memory (EPROM), a static random access memory (SRAM), a read-only memory (ROM), a magnetic memory, a flash memory, a programmable read-only memory (PROM).

The present application provides a computer-readable storage medium, the storage medium stores at least one instruction, and the at least one instruction is loaded and executed by the processor to implement the method for monitoring the PDCCH provided by the above each method implementation.

The present application also provides a computer program product, when the computer program product runs on a computer, the computer program product causes the computer to execute the method for monitoring the PDCCH provided by the above each method embodiment.

Those skilled in the art should notice that in one or more of the above examples, the functions described in the embodiments of the present application can be implemented by hardware, software, firmware or any combination thereof. When the functions are implemented in software, the functions can be stored in a computer-readable medium or transmitted as one or more instructions or codes on the computer-readable medium. The computer-readable medium includes a computer storage medium and a communication medium, where the communication medium includes any medium that facilitates the transfer of computer programs from one place to another. The storage medium can be any available medium that can be accessed by a general or specific computer.

The above are only preferred embodiments of the present application, and are not used to limit the present application. Any modifications, equivalent substitutions, improvements, etc., made within the spirit and principle of the present application shall be included within the protection scope of the present application.

What is claimed is:

1. A method for monitoring a physical downlink control channel (PDCCH), wherein the method comprises:
    monitoring, by a terminal, a power saving signal, wherein the power saving signal is used to indicate whether to wake up the terminal to perform the PDCCH monitoring within an On Duration time period of a discontinuous reception (DRX); and
    performing, by the terminal, the PDCCH monitoring within the On Duration time period of the DRX when the power saving signal is not detected;
    wherein the method further comprises:
    performing, by the terminal, the PDCCH monitoring according to an indication of the power saving signal when monitoring the power saving signal;
    wherein the performing the PDCCH monitoring according to an indication of the power saving signal comprises:
    performing, by the terminal, the PDCCH monitoring within the On Duration time period of the DRX when the power saving signal is a first power saving signal; and
    ignoring, by the terminal, the PDCCH monitoring within the On Duration time period of the DRX when the power saving signal is a second power saving signal;
    wherein after the performing, by the terminal, the PDCCH monitoring within the On Duration time period of the DRX when the power saving signal is the first power saving signal, the method further comprises:
    starting, by the terminal, a target timer when an On Duration timer of the DRX expires and when not monitoring the PDCCH within the On Duration time period of the DRX, and performing the PDCCH monitoring before the target timer expires;
    wherein the starting the target timer when the On Duration timer of the DRX expires, and performing the PDCCH monitoring before the target timer expires comprises:
    starting a first timer when the On Duration timer of the DRX expires, and performing the PDCCH monitoring before the first timer expires, wherein the first timer is a timer that is different from a DRX-inactivity Timer;
    wherein the performing, by the terminal, the PDCCH monitoring within the On Duration time period of the DRX further comprises:
    performing, by the terminal, the PDCCH monitoring by adopting a first PDCCH searching space within the On Duration time period of the DRX;
    wherein the performing the PDCCH monitoring before the first timer expires comprises:
    performing, by the terminal, the PDCCH monitoring by adopting a second PDCCH search space before the first timer expires, wherein the second PDCCH search space is different from the first PDCCH search space.

2. The method according to claim 1, wherein after the performing, by the terminal, the PDCCH monitoring within the On Duration time period of the DRX when the power saving signal is a first power saving signal, further comprises:
    entering, by the terminal, the DRX when not monitoring the PDCCH within the On Duration time period of the DRX.

3. The method according to claim 1, wherein the method further comprises:
    receiving, by the terminal, a configuration signaling of an access network device, wherein the configuration signaling is used to configure the second PDCCH searching space; and
    wherein the configuration signaling comprises radio resource control (RCC) or media access control control element (MAC CE).

4. A terminal, wherein the terminal comprises a processor, a receiver and a memory, wherein the memory stores at least one instruction, the at least one instruction, when being executed by the processor, is used to cause the processor to:
    monitor a power saving signal, wherein the power saving signal is used to indicate whether to wake up the terminal to perform the physical downlink control channel (PDCCH) monitoring within an On Duration time period of a discontinuous reception (DRX); and
    perform the PDCCH monitoring within the On Duration time period of the DRX when the power saving signal is not detected by the processor;
    wherein the processor is further configured to:
    perform, when the power saving signal is detected by the processor, the PDCCH monitoring according to an indication of the power saving signal;
    wherein the processor is further configured to:
    perform the PDCCH monitoring within the On Duration time period of the DRX when the power saving signal is a first power saving signal; when the power saving signal is a second power saving signal, the terminal ignores the PDCCH monitoring within the On Duration time period of the DRX;
    wherein the processor is further configured to:
    start, when the power saving signal is the first power saving signal, after the PDCCH monitoring is performed within the On Duration time period of the DRX, when the PDCCH is not detected within the On Duration time period of the DRX, a target timer when an On Duration timer of the DRX expires, and perform the PDCCH monitoring before the target timer expires;
    wherein the processor is further configured to:
    start, when the power saving signal is the first power saving signal, after the PDCCH monitoring is performed within the On Duration time period of the DRX, when the PDCCH is not detected within the On Duration time period of the DRX, a first timer when the On Duration timer of the DRX expires, and perform the PDCCH monitoring before the first timer expires, wherein the first timer is a timer that is different from a DRX-inactivity Timer;

wherein the processor is further configured to:
perform the PDCCH monitoring by adopting a first PDCCH searching space within the On Duration time period of the DRX when the power saving signal is not detected by the processor;

wherein the processor is further configured to:
perform, before the first timer expires, the PDCCH monitoring by adopting a second PDCCH searching space, wherein the second PDCCH searching space is different from the first PDCCH searching space.

5. The terminal according to claim 4, wherein the processor is further configured to:
when the power saving signal is the first power saving signal, after the PDCCH monitoring is performed within the On Duration time period of the DRX, when the PDCCH is not detected within the On Duration time period of the DRX, enter the DRX.

6. The terminal according to claim 4, wherein the processor is further configured to:
control the receiver to receive a configuration signaling of an access network device, wherein the configuration signaling is used to configure the second PDCCH searching space;
wherein the configuration signaling comprises radio resource control (RCC) or media access control control element (MAC CE).

7. A non-transitory computer-readable storage medium, wherein the storage medium stores at least one instruction, the at least one instruction is used to, when being executed by the processor, implement the method of monitoring a physical downlink control channel (PDCCH) according to claim 1.

* * * * *